United States Patent [19]
Heimann et al.

[11] Patent Number: 5,983,939
[45] Date of Patent: *Nov. 16, 1999

[54] SINGLE-CONTROL MIXING VALVE

[75] Inventors: Bruno Heimann, Fröndenberg; Bernd Bischoff, Hemer; Kerstin Keiter, Menden, all of Germany

[73] Assignee: Friedrich Grohe AG, Hemer, Germany

[*] Notice: This patent is subject to a terminal disclaimer.

[21] Appl. No.: 08/880,087

[22] Filed: Jun. 20, 1997

[30] Foreign Application Priority Data

Jul. 13, 1996 [DE] Germany .............................. 196 28 397

[51] Int. Cl.⁶ .................................................. F16K 11/074
[52] U.S. Cl. .................. 137/625.17; 137/382; 137/625.4
[58] Field of Search ........................... 137/625.17, 625.4, 137/625.41, 556, 556.3, 382, 377

[56] References Cited

U.S. PATENT DOCUMENTS

| | | | |
|---|---|---|---|
| 4,362,186 | 12/1982 | Parkinson et al. | 137/625.17 |
| 4,535,814 | 8/1985 | Pawelzik et al. | 137/625.17 X |
| 4,610,272 | 9/1986 | Gottwald . | |
| 4,651,774 | 3/1987 | Oberdorfer | 137/625.17 X |
| 4,813,455 | 3/1989 | Iqbal | 137/625.17 |
| 4,880,134 | 11/1989 | Wood, Jr. | 137/382 X |
| 5,730,176 | 3/1998 | Heimann et al. | 137/625.17 X |

FOREIGN PATENT DOCUMENTS

| | | |
|---|---|---|
| 0140275 | 5/1985 | European Pat. Off. . |
| 0199960 | 12/1986 | European Pat. Off. . |
| 0733839 | 9/1996 | European Pat. Off. . |
| 3124241 | 12/1982 | Germany . |
| 3606097 | 8/1987 | Germany . |
| 8900275 | 1/1989 | WIPO ................................... 137/377 |

*Primary Examiner*—John Rivell
*Assistant Examiner*—Meredith H. Schoenfeld
*Attorney, Agent, or Firm*—Herbert Dubno; Andrew Wilford

[57] ABSTRACT

A mixing valve has a valve housing formed with a seat, a flow-controlling valve cartridge fitted to the seat, and a cover engageable over the cartridge, pivotal on the cartridge about a first axis, and formed with an aperture. A handle engaging through the aperture with the cartridge is pivotal through an arc of less than 360° about the first axis with the cover for controlling a characteristic of flow through the valve cartridge and is pivotal about a second axis generally perpendicular to the first axis for controlling another characteristic of flow through the valve cartridge. Interengaging formations on the cover and on the housing allow relative axial movement of the cover and the housing in an angular position of the cover relative to the housing outside the arc and prevent relative axial movement of the cover and the housing inside the arc.

17 Claims, 5 Drawing Sheets

SINGLE-CONTROL MIXING VALVE

FIELD OF THE INVENTION

The present invention relates to a single-control mixing valve. More particularly this invention concerns such a valve normally built into a faucet and having a lever movable in one direction to control flow volume and another direction to control temperature.

BACKGROUND OF THE INVENTION

In commonly owned U.S. Pat. No. 4,610,272 a faucet is disclosed having a mixing-valve actuator comprising a valve housing and a valve member movable by a hand lever which is partly accommodated within the housing and operatively connected to the valve member. The hand lever is movable about two axes perpendicular to each other and is provided with an arcuate portion that projects through a slot of a valve cover into the interior of the housing where it is connected to the movable valve member. The arcuate portion has an inner shape that is aligned with the adjacent part of the cover and has a radius extending from a point on one of the axes.

As the lever is rotated about the center axis of the cartridge, on which the cover is normally centered, it control one characteristic of flow through the cartridge, normally mixing ratio and when tipped about a second axis perpendicular to the first axis it controls another characteristic of flow through the cartridge, normally volume. As a rule the cover itself is rotatable on the housing with the lever and is formed with an aperture constituted as a slot centered on a plane including the first axis and perpendicular to the second axis.

The cover is normally a two-piece affair interconnected by a screwthread. It must be carefully assembled and fitted to the housing, and has a tendency to come loose or apart after some use.

OBJECTS OF THE INVENTION

It is therefore an object of the present invention to provide an improved single-lever mixing valve.

Another object is the provision of such an improved single-lever mixing valve which overcomes the above-given disadvantages, that is which is of simple construction and whose cover is easy to install and remove while remaining solidly in place during long-term use.

SUMMARY OF THE INVENTION

A mixing valve has according to the invention a valve housing formed with a seat, a flow-controlling valve cartridge fitted to the seat, and a cover engageable over the cartridge, pivotal on the cartridge about a first axis, and formed with an aperture. A handle engaging through the aperture with the cartridge is pivotal through an arc of less than 360° about the first axis with the cover for controlling a characteristic of flow through the valve cartridge and is pivotal about a second axis generally perpendicular to the first axis for controlling another characteristic of flow through the valve cartridge. Interengaging formations on the cover and on the housing allow relative axial movement of the cover and the housing in an angular position of the cover relative to the housing outside the arc and prevent relative axial movement of the cover and the housing inside the arc.

More particularly according to the invention the formations include an annular set of radially outwardly projecting tabs spaced angularly about the first axis, generally fixed on the housing, and defining a plurality of notches and an annular set of radially inwardly projecting tabs spaced angularly about the first axis, fixed on the cover, and defining a plurality of notches complementary to the tabs of the housing. At least one of the notches of one of the sets and one of the tabs of the other set is of a different angular width than the other notches of the one set and the other tabs of the other set so that the tabs of the one set can only pass through the notches of the other set in one angular position of the cover on the housing.

Thus with the system of this invention prior to installation of the handle the cover is simply slipped over the housing with its tabs passing between the tabs of the housing. Then the cover is rotated to align the aperture with the mount of the cartridge and the handle is installed. Since during normal use the cover is never pivoted back into the position in which its tabs can fit between those of the housing, this cover will remain solidly in place. The cover can be a simple one-piece element of the appropriate color that is produced at low cost.

The cartridge according to the invention is provided with stop means for preventing pivoting of the handle about the first axis through more than about 180°. The mounting position of the cover is offset by 100° from the center of is range.

The housing in accordance with the invention includes a mounting ring provided with the housing tabs. The housing is provided with springs urging the mounting ring axially of the first axis toward the seat so that the cover secured by the housing tabs is urged by the springs toward the seat. More particularly the mounting ring includes an outer ring fixed to the cartridge and an inner ring carrying the housing tabs. The springs are angled webs extending between the rings and unitarily formed therewith. At least one of the rings is formed with radially inwardly projecting formations rotationally fixing the rings on the cartridge. The rings and webs are unitarily formed of plastic and the inner ring is internally formed with cutouts at the housing tabs so that the tabs can be limitedly elastically inwardly deflected. Each set includes three tabs.

The handle according to the invention includes an angle piece and the cartridge includes a lever secured by the angle piece to the handle. The aperture is a slot extending along a plane including the first axis and perpendicular to the second axis and the handle is provided with a skirt covering the slot.

The cover in accordance with the invention is provided with a scale and the housing carries a pointer mark cooperating with the scale and a slide ring is engaged between the housing and the cover. This cover has a generally semispherically closed outer end and is made of one piece of plastic. It is provided internally adjacent the aperture with a low-friction lining.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
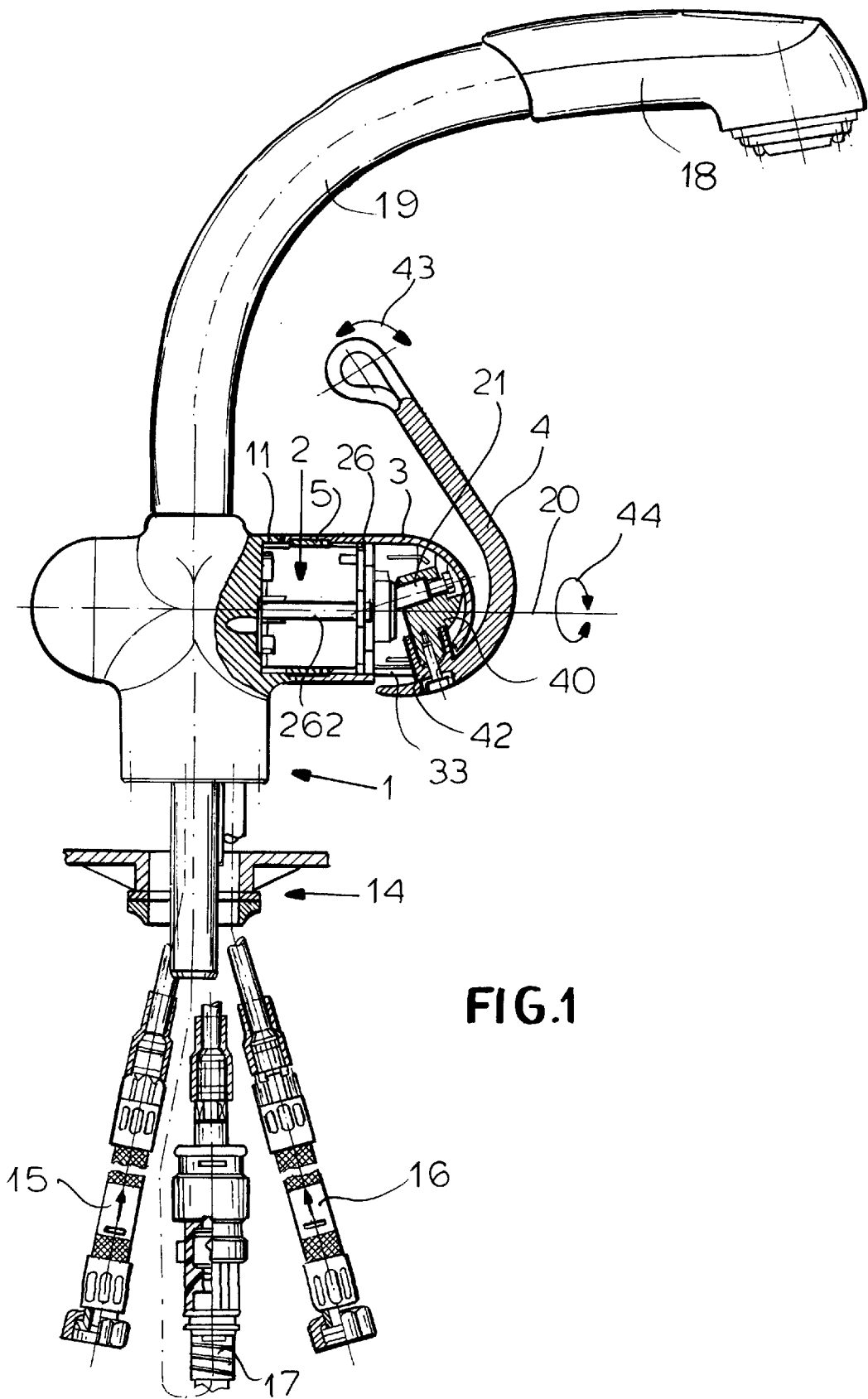
FIG. 1 is a side view partly in section of a faucet assembly with the valve according to the invention.

As seen in FIG. 1 a faucet assembly according to the invention has a cast metal housing 1 normally secured to an unillustrated deck or counter by a retaining assembly 14. Hot-and cold-water supply lines 15 and 16 are connected to the bottom of the housing 1 and a mixed-water hose 17 exits the bottom of the housing 1 then passes back up and through a hollow faucet tube 19 to a spray head 18.

Figure 2:
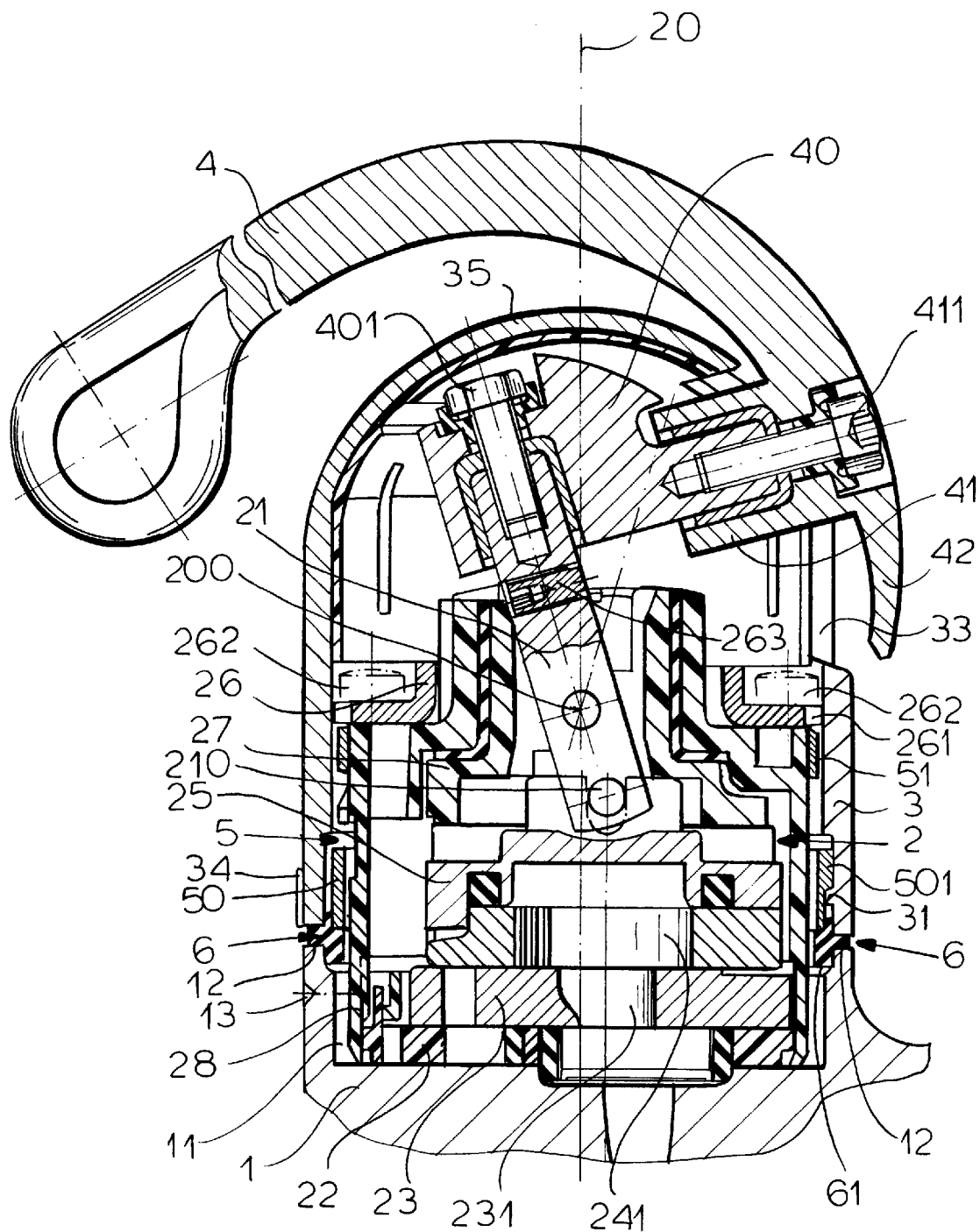
FIG. 2 is a larger-scale section through the valve of this invention.

FIG. 2 shows how the housing 1 is formed with a chamber or pocket 11 having a rim 12 and holding a valve cartridge 2 having an outer plastic housing sleeve 28 centered on an axis 20 and having a floor disk or member 22 on which is fixed a ceramic valve disk 23. A movable ceramic valve disk 24 slidable on the disk 23 is secured to an actuating part 25 pivoted by a pin 210 on a lower end of a lever 21 centrally pivoted at an axis 200 perpendicular to the axis 20 on the cartridge housing 28. The upper end of the lever 21 is secured by a screw 401 to an angle piece 40 to which a collar 41 of a C-shaped handle 4 is secured by a screw 411. A hold-down ring 26 is secured by screws 262 (shown in FIG. 2 offset by 90° from their actual locations) to the housing 1. A screw 263 in the lever 21 can be extended to limit maximum flow from the head 18. This structure is all generally standard.

The floor member 22 and fixed disk 23 are each formed with three throughgoing holes 231 (one only shown) connected to the lines 15 and 16 and the hose 17 and the movable disk 24 is formed with a single throughgoing hole 241 closed by the part 25.

Thus as is standard pivoting of the handle 4 along with the lever 21, part 25, and disk 24 as shown by arrow 44 about the center axis 20 will change the mix of hot and cold water fed from the lines 15 and 16 to the hose 17. Pivoting of the handle 4 as shown by arrow 43 about the axis 200 will change the volume of flow to the hose 17.

Figure 6:
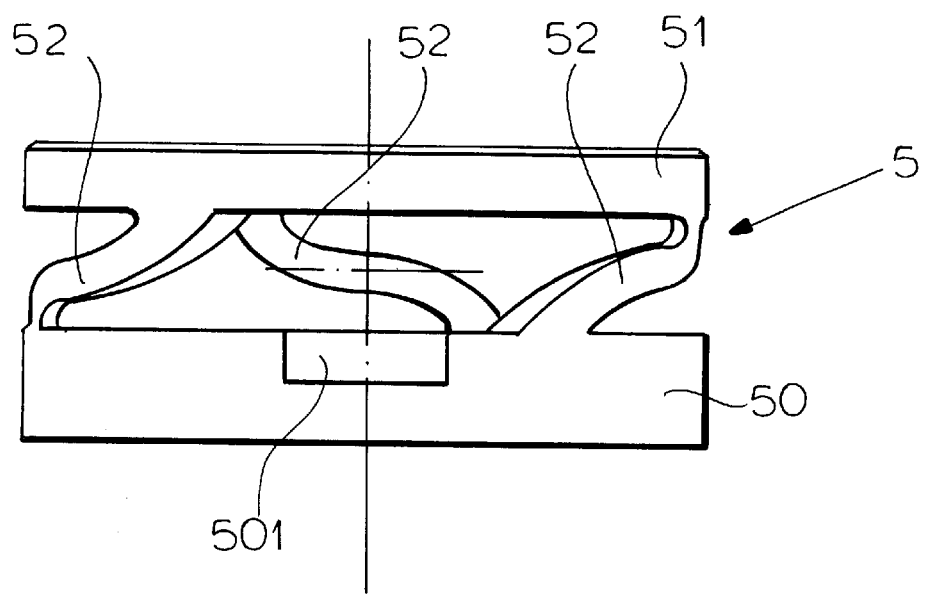
FIG. 6 is a side view of the retaining sleeve of the invention.
Figure 7:
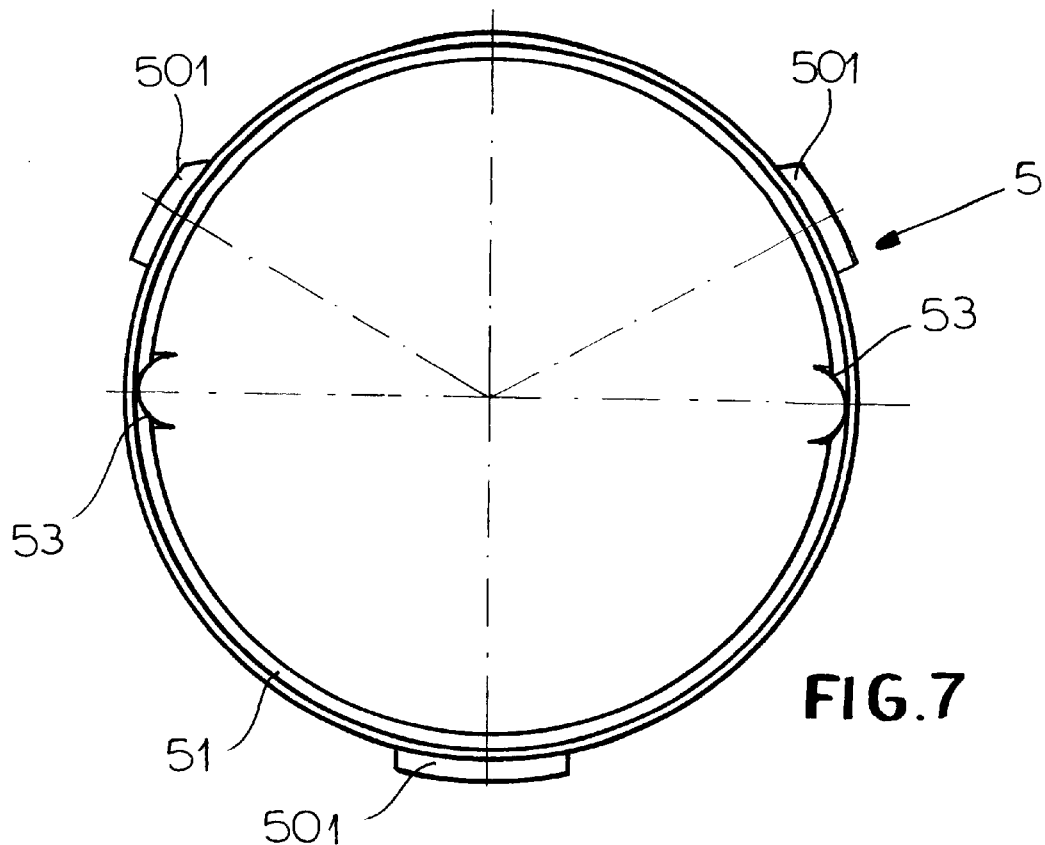
FIGS. 7 and 8 are opposite end views of the sleeve of FIG. 6.
Figure 8:
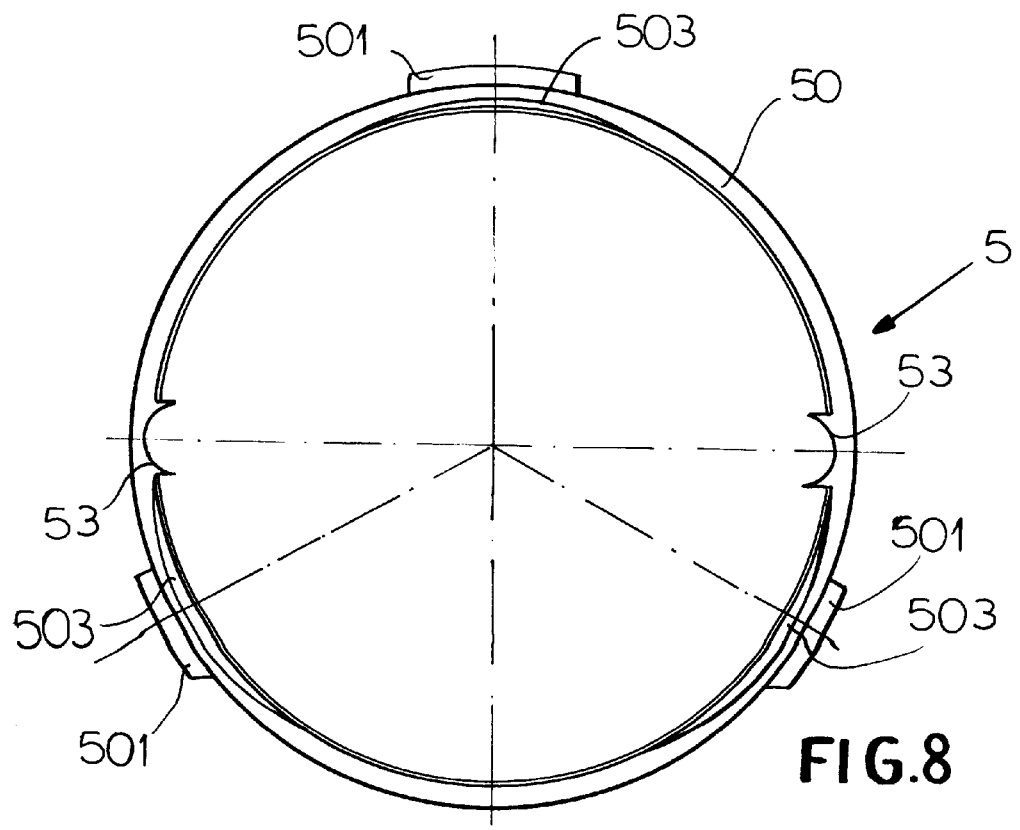

According to the invention as shown in FIGS. 6 through 8 engaged between radially outwardly projecting tabs 261 of the ring 26 and a shoulder 61 of a slide ring 6 sitting on the rim 12 of the housing 1 is a plastic hold-down sleeve 5 having a lower end ring 50 and an upper ring 51 interconnected by elastically deformable angled spring webs 52. Cutouts or recesses 53 formed diametrically opposite each other in the sleeve 5 engage snugly around the screws 262 to retain this part against rotating on the housing 1. The lower ring 50 is formed with three outwardly projecting lugs or tabs 501 on its outer surface and its inner surface is cut away at 503 inside each such lug 501 so same can spring radially inward. These lugs 501 are not all the same angular dimension and/or are not perfectly angularly equispaced for reasons described below.

The cartridge 2 is enclosed in a generally cylindrical cover sleeve 3 having a semispherically closed end 35 and formed with a throughgoing slot 33 through which the handle 4 projects, with a skirt 42 of the handle 4 covering this slot 33 to prevent splash-back into it. This cover 3 is centered on the axis 20 and the slot 33 is centered on a plane that is perpendicular to the axis 200 and includes the axis 20. Internally the cover 3 is provided with a liner 331 of a low-friction plastic. A scale 34 on the cover 3 cooperates with a pointer mark 13 on the housing 1 to indicate the output temperature.

Figure 3:
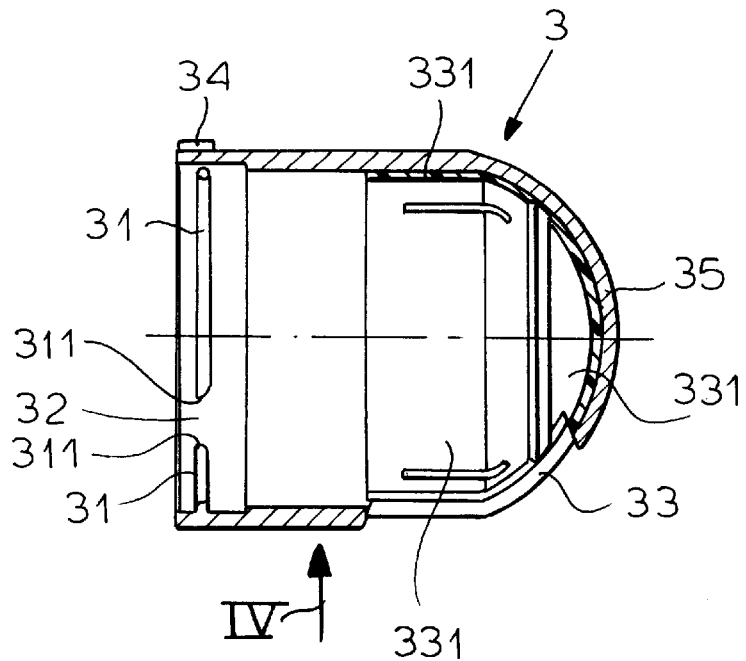
FIG. 3 is an axial section through the cover of the valve of the invention.
Figure 4:
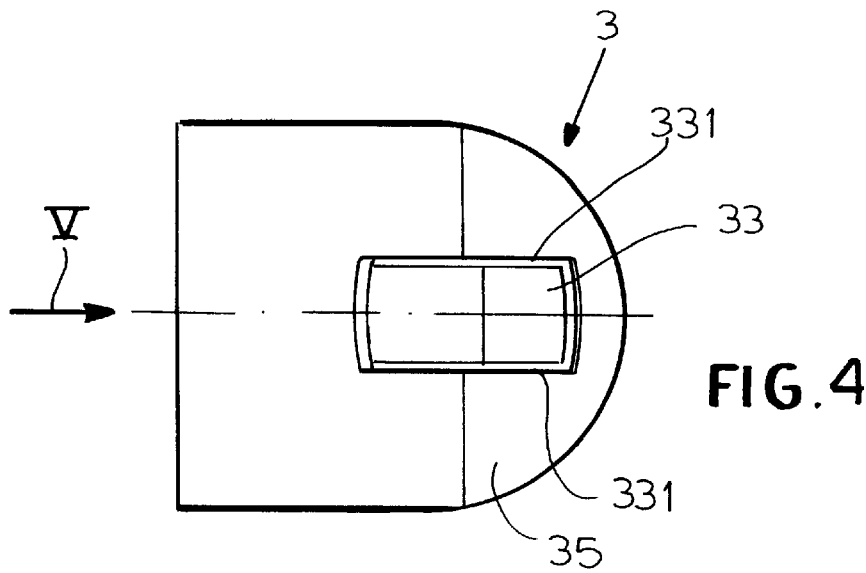
FIG. 4 is a side view taken in the direction of arrow IV of FIG. 3.
Figure 5:
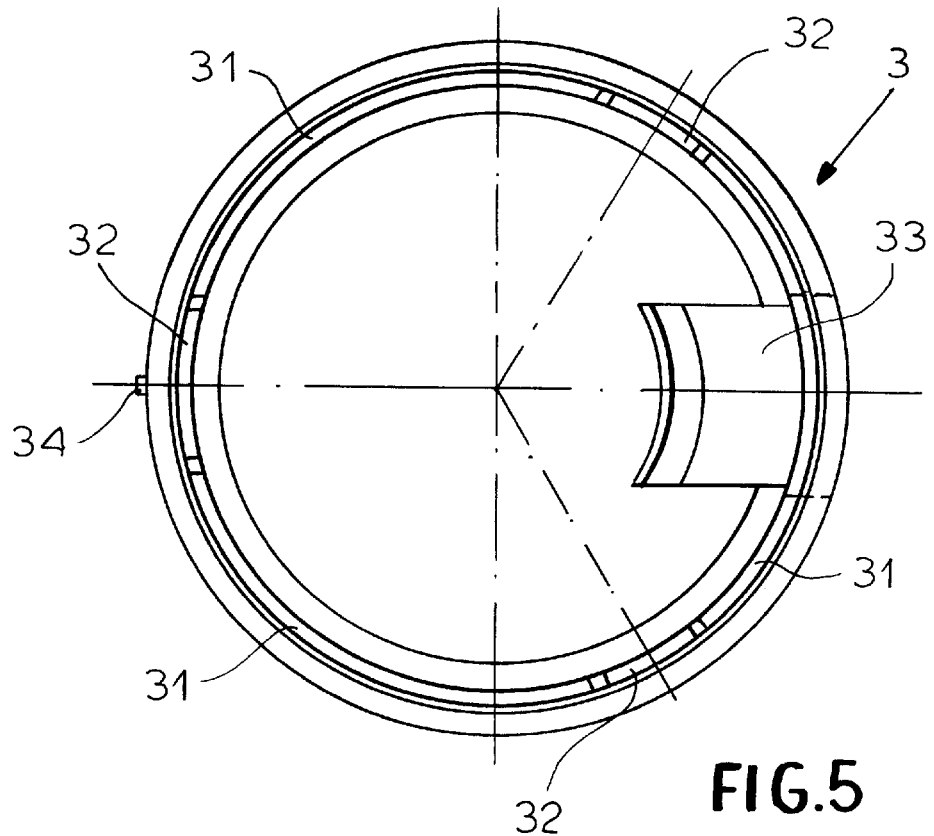
FIG. 5 is a large-scale end view taken in the direction of arrow V of FIG. 4.

This cover as shown in FIGS. 3 through 5 is formed with three internal inwardly extending ridges or tabs 31 defining three inwardly open notches 32 that are perfectly complementary to the tabs 501. Thus it is possible to slip the cover 3 down over the tabs 501 in only one angular position of the cover 3 relative to the housing 1 so as to pass the tabs 501 through the notches 32 whose ends are beveled as indicated at 311 so that when subsequently turned the ridges 31 will slide under the tabs 501 with some axial compression of the spring webs 52. As a result the part 5 will press the cover 3 down against the slip ring 6.

To install the cover 3 it is therefore merely pushed down over the cartridge 3 before installation of the handle 4. This can only be done, as mentioned, in one angular position of the cover 3 on the housing 1, a position which lies wholly outside any position the cover 3 can assume during normal operation of the valve. The cover 3 is then rotated until the slot 3 is aligned with the angle piece 40 and the extension 41 of the handle 4 is secured by the screw 411 thereto. The valve cartridge 2 has stops that limit pivoting of the handle 4 to about 100° about the axis 20 from the full-hot to the full-cold position, and the installation position is normally 180° offset from the center position, that is corresponding to an equal mix of hot and cold water, during use the cover 3 will be retained solidly in place.

We claim:

1. A mixing valve comprising:

a valve housing formed with a seat;

a flow-controlling valve cartridge fitted to the seat;

means fixing the cartridge in the housing;

a sleeve-like cover engageable over the cartridge, pivotal on the cartridge about a first axis, and formed with an aperture;

means including a handle engaging through the aperture with the cartridge and pivotal through an arc of less than 360° about the first axis with the cover for controlling a characteristic of flow through the valve cartridge and pivotal about a second axis generally perpendicular to the first axis for controlling another characteristic of flow through the valve cartridge; and means including interengaging formations on the cover and on the cartridge offset along the first axis from the housing for relative axial movement of the cover and the cartridge in an angular position of the cover relative to the housing outside the arc and for preventing relative axial movement of the cover and the cartridge inside the arc.

2. The mixing valve defined in claim 1 wherein the formations include an annular set of radially outwardly projecting tabs spaced angularly about the first axis, generally fixed on the cartridge, and defining a plurality of notches and an annular set of radially inwardly projecting tabs spaced angularly about the first axis, fixed on the cover, and defining a plurality of notches complementary to the tabs of the cartridge, at least one of the notches of one of the sets and one of the tabs of the other set being of a different angular width than the other notches of the one set and the other tabs of the other set, whereby the tabs of the one set can only pass through the notches of the other set in one angular position of the cover on the housing.

3. The mixing valve defined in claim 2 wherein the cartridge is provided with stop means for preventing pivoting of the handle about the first axis through more than about 180°.

4. The mixing valve defined in claim 2 wherein the cartridge is provided with a mounting ring provided with the outwardly projecting tabs.

5. A mixing valve comprising:

a valve housing formed with a seat;

a flow-controlling valve cartridge fitted to the seat;

means fixing the cartridge in the housing provided with a mounting ring;

a sleeve-like cover made of one piece of plastic, engageable over the cartridge, pivotal on the cartridge about a first axis, and formed with an aperture;

means including a handle engaging through the aperture with the cartridge and pivotal through an arc of less than 360° about the first axis with the cover for controlling a characteristic of flow through the valve cartridge and pivotal about a second axis generally perpendicular to the first axis for controlling another characteristic of flow through the valve cartridge;

means including interengaging formations on the cover and on the mounting ring offset along the first axis from the housing for relative axial movement of the cover and the cartridge in an angular position of the cover relative to the housing outside the arc and for preventing relative axial movement of the cover and the cartridge inside the arc, the formations including an annular set of radially outwardly projecting tabs spaced angularly about the first axis, generally fixed on the cartridge, and defining a plurality of notches and an annular set of radially inwardly projecting tabs spaced angularly about the first axis, fixed on the cover, and defining a plurality of notches complementary to the tabs of the cartridge, at least one of the notches of one of the sets and one of the tabs of the other set being of a different angular width than the other notches of the one set and the other tabs of the other set, whereby the tabs of the one set can only pass through the notches of the other set in one angular position of the cover on the housing; and spring means urging the cover axially of the first axis toward the seat, whereby the cover secured by the housing tabs is urged by the spring means toward the seat.

6. The mixing valve defined in claim 5 wherein the mounting ring includes an outer ring fixed to the cartridge and an inner ring carrying the housing tabs, the spring means including angled webs extending between the rings and unitarily formed therewith.

7. The mixing valve defined in claim 6 wherein at least one of the rings is formed with radially inwardly projecting formations rotationally fixing the rings on the cartridge.

8. The mixing valve defined in claim 6 wherein the rings and webs are unitarily formed of plastic.

9. The mixing valve defined in claim 6 wherein the inner ring is internally formed with cutouts at the housing tabs, whereby the tabs can be limitedly elastically inwardly deflected.

10. The mixing valve defined in claim 6 wherein each set includes three tabs.

11. The mixing valve defined in claim 1 wherein the handle includes an angle piece and the cartridge includes a lever secured by the angle piece to the handle.

12. The mixing valve defined in claim 1 wherein the aperture is a slot extending along a plane including the first axis and perpendicular to the second axis, the handle being provided with a skirt covering the slot.

13. The mixing valve defined in claim 1 wherein the cover is provided with a scale and the housing carries a pointer mark cooperating with the scale.

14. The mixing valve defined in claim 1, further comprising a slide ring engaged between the housing and the cover.

15. The mixing valve defined in claim 1 wherein the cover has a generally semispherically closed outer end.

16. The mixing valve defined in claim 1 wherein the cover is made of one piece of plastic.

17. A mixing valve comprising:

a valve housing formed with a seat;

a flow-controlling valve cartridge fitted to the seat;

means fixing the cartridge in the housing a sleeve-like cover made of one piece of plastic, engageable over the cartridge, pivotal on the cartridge about a first axis, formed with an aperture, and provided internally adjacent the aperture with a low-friction lining;

means including a handle engaging through the aperture with the cartridge and pivotal through an arc of less than 360° about the first axis with the cover for controlling a characteristic of flow through the valve cartridge and pivotal about a second axis generally perpendicular to the first axis for controlling another characteristic of flow through the valve cartridge; and means including interengaging formations on the cover and on the cartridge offset along the first axis from the housing for relative axial movement of the cover and the cartridge in an angular position of the cover relative to the housing outside the arc and for preventing relative axial movement of the cover and the cartridge inside the arc.

\* \* \* \* \*